(12) United States Patent
Suzuki et al.

(10) Patent No.: US 11,321,251 B2
(45) Date of Patent: May 3, 2022

(54) INPUT/OUTPUT PROCESS ALLOCATION CONTROL DEVICE, INPUT/OUTPUT PROCESS ALLOCATION CONTROL METHOD, AND RECORDING MEDIUM HAVING INPUT/OUTPUT PROCESS ALLOCATION CONTROL PROGRAM STORED THEREIN

(71) Applicant: NEC Corporation, Tokyo (JP)

(72) Inventors: Jun Suzuki, Tokyo (JP); Yuki Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/055,381

(22) PCT Filed: May 14, 2019

(86) PCT No.: PCT/JP2019/019153
§ 371 (c)(1),
(2) Date: Nov. 13, 2020

(87) PCT Pub. No.: WO2019/221131
PCT Pub. Date: Nov. 21, 2019

(65) Prior Publication Data
US 2021/0216481 A1    Jul. 15, 2021

(30) Foreign Application Priority Data

May 18, 2018 (JP) .............................. JP2018-095886

(51) Int. Cl.
*G06F 13/20* (2006.01)
*G06F 9/455* (2018.01)
(Continued)

(52) U.S. Cl.
CPC .......... *G06F 13/20* (2013.01); *G06F 9/45558* (2013.01); *G06F 13/4282* (2013.01);
(Continued)

(58) Field of Classification Search
CPC .................................. G06F 3/00; H04L 12/24
See application file for complete search history.

(56) References Cited

U.S. PATENT DOCUMENTS

2005/0108450 A1* 5/2005 Sahara .................... G06F 3/061
                                                                710/52
2011/0305286 A1* 12/2011 Shimezawa ......... H04L 27/2688
                                                               375/260
(Continued)

FOREIGN PATENT DOCUMENTS

JP   2016-167151 A    9/2016
WO  2015/145983 A1  10/2015

OTHER PUBLICATIONS

International Search Report for PCT Application No. PCT/JP2019/019153, dated Jul. 16, 2019.
(Continued)

*Primary Examiner* — Getente A Yimer
(74) *Attorney, Agent, or Firm* — Sughrue Mion, PLLC (57) ABSTRACT

An input/output process allocation control device includes: allocation unit that, in a case where a second information processing resource element different from a first information processing resource element executes an input/output-data-transmission/reception-process with an input/output device in response to an access request to the input/output device by the first information processing resource element, the first and second information processing resource elements being among a plurality of information processing resource elements included in an information processing apparatus, allocates the input/output-data-transmission/reception-process to the second information processing resource element and excluding the second information processing resource element, of the plurality of information processing resource elements, from a new allocation destination of a process including an access request to the input/output device.

8 Claims, 5 Drawing Sheets

(51) Int. Cl.
   *G06F 13/42* (2006.01)
   *G06F 9/50* (2006.01)
   *G06F 9/52* (2006.01)
   *G06F 13/10* (2006.01)
   *G06F 13/14* (2006.01)
(52) U.S. Cl.
   CPC .............. *G06F 2009/45579* (2013.01); *G06F 2213/0026* (2013.01)

(56) References Cited

U.S. PATENT DOCUMENTS

| | | | |
|---|---|---|---|
| 2014/0188451 A1* | 7/2014 | Asahara | H04L 45/38 703/13 |
| 2016/0149589 A1* | 5/2016 | Ikegaya | H03M 13/2778 714/758 |
| 2016/0149594 A1* | 5/2016 | Ikegaya | H04L 1/0041 714/776 |
| 2016/0266933 A1 | 9/2016 | Sakai | |
| 2017/0093430 A1* | 3/2017 | Ikegaya | H04L 1/0057 |
| 2017/0109310 A1 | 4/2017 | Takahashi et al. | |

OTHER PUBLICATIONS

English translation of Written opinion for PCT Application No. PCT/JP2019/019153, dated Jul. 16, 2019.

Isobe et al., "Prototyping of multi operating system environment for multi-core processor", IPSJ SIG Technical Report, Jun. 15, 2009, pp. 1-8, ISSN 1884-0930.

* cited by examiner

INPUT/OUTPUT PROCESS ALLOCATION CONTROL DEVICE, INPUT/OUTPUT PROCESS ALLOCATION CONTROL METHOD, AND RECORDING MEDIUM HAVING INPUT/OUTPUT PROCESS ALLOCATION CONTROL PROGRAM STORED THEREIN

This application is a National Stage Entry of PCT/JP2019/019153 filed on May 14, 2019, which claims priority from Japanese Patent Application 2018-095886 filed on May 18, 2018, the contents of all of which are incorporated herein by reference, in their entirety.

TECHNICAL FIELD

The present invention relates to a technology that controls allocation of an input/output-data-transmission/reception-process of transmitting/receiving data to/from an input/output device to any one of a plurality of information processing resources.

BACKGROUND ART

A processor (multi-core processor) having a plurality of cores mounted thereon, a hardware virtualization technology, and the like that have been achieved by rapid advance of computer technologies in recent years have been widely used in various systems. Then, there is increasing expectations to a technology that achieves an easy-to-use system with high performance using such a multi-core processor, a hardware virtualization technology, or the like.

As a technology related to such a technology, PTL 1 discloses a program processing apparatus that maintains performance of a process after activation and improves performance at the time of the activation in a program in which cache mishits (false sharing or the like) frequently occur only at the time of an activation process in a case of execution by the multi-core processor. This apparatus manages a thread generated in a specific process, fixes an operation core of the thread generated during the activation process to a specific core, and does not perform setting on an operation core of a thread of a specific process generated after the activation process has been completed. At a timing when the activation process is been completed, this apparatus restores the setting on the operation core of the thread for the specific process that has been generated in advance.

PTL 2 discloses a data processing device that expands an application range of a pass-through technology in which a guest Operating System (OS) directly controls a remote device connected via a network. This device includes a host OS that provides a virtual hardware environment to the guest OS that executes an Input/Output (I/O) process with a device provided in a remote device connected via the network. Then, the host OS traps an I/O command issued by the guest OS, encapsulates the trapped I/O command, and sends the I/O command to the remote device as a network packet.

CITATION LIST

Patent Literature

[PTL 1] JP 2016-167151 A
[PTL 2] WO 2015/145983 A

SUMMARY OF INVENTION

Technical Problem

In recent years, as one of the hardware virtualization technologies described above, various technologies that achieve a communication control function by hardware by software have been developed. As an example, there is a technology that achieves the ExpEther (ExpEther: registered trademark) that is a technology of virtualizing the Peripheral Component Interconnect (PCI) Express (registered trademark) on the Ethernet (Ethernet: registered trademark) by software.

Here, a case is considered where the multi-core processor described above (that is, processor including plurality of cores that is information processing resource element) achieves the ExpEther by software. However, in the present application, a unit of allocation of a process is referred to as an information processing resource element.

Figure 4:
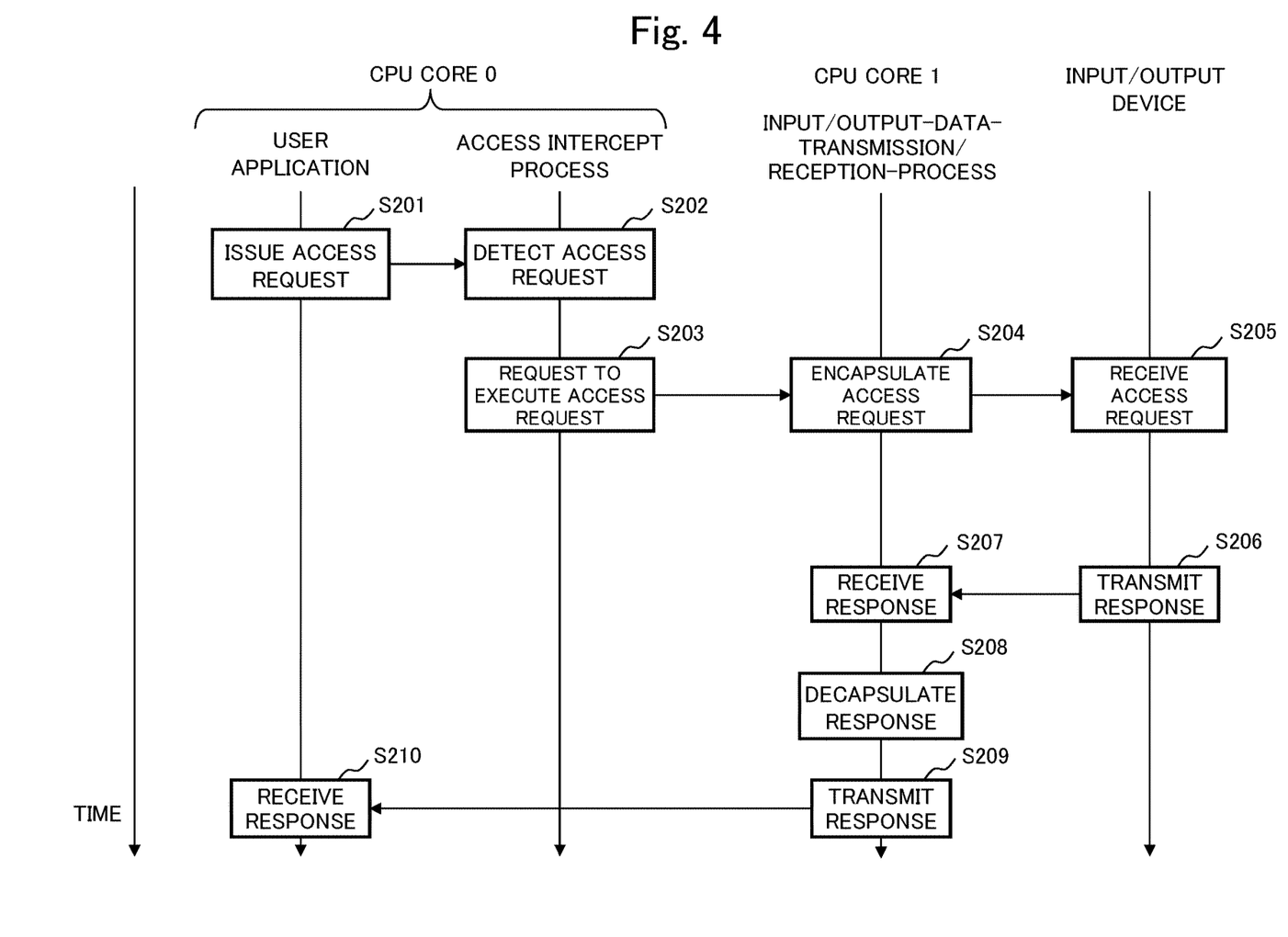
FIG. 4 is a sequence diagram in a case where a general system that achieves ExpEther by software normally processes an access request to an input/output device.

FIG. 4 is a sequence diagram in a case where a general system that achieves the ExpEther by the software normally processes an access request to an input/output device (for example, storage device). However, it is assumed that this system have two Central Processing Unit (CPU) cores and a user application be allocated to one of the CPU cores.

In the system that achieves the ExpEther by the software, the user application and the input/output-data-transmission/reception-process according to the access request to the input/output device issued by the user application are usually allocated to different CPU cores. Such control is performed because, in a case where a single CPU core executes a large number of processes including the user application, the input/output-data-transmission/reception-process, or the like, the number of processes in which an information processing resource regarding the CPU core is shared increases, and accordingly, a possibility that deadlock occurs increases.

As illustrated in FIG. 4, a CPU core 0 executes a user application that accesses an input/output device and executes an access intercept process incorporated in a kernel of an OS. Then, a CPU core 1 executes an input/output-data-transmission/reception-process.

In a case where the user application issues an access request to the input/output device (step S201), the access intercept process detects the access request (step S202). The access intercept process requests the input/output-data-transmission/reception-process to execute the access request (step S203). The input/output-data-transmission/reception-process encapsulates the access request and transmits the encapsulated access request to the input/output device (step S204).

The input/output device receives the access request (step S205) and transmits a response to the access request to the input/output-data-transmission/reception-process (step S206). The input/output-data-transmission/reception-process receives the response (step S207), decapsulates the response (step S208), and transmits the decapsulated response to the user application (step S209). When the user application receives the response (step S210), the process of the access request is completed.

Figure 5:
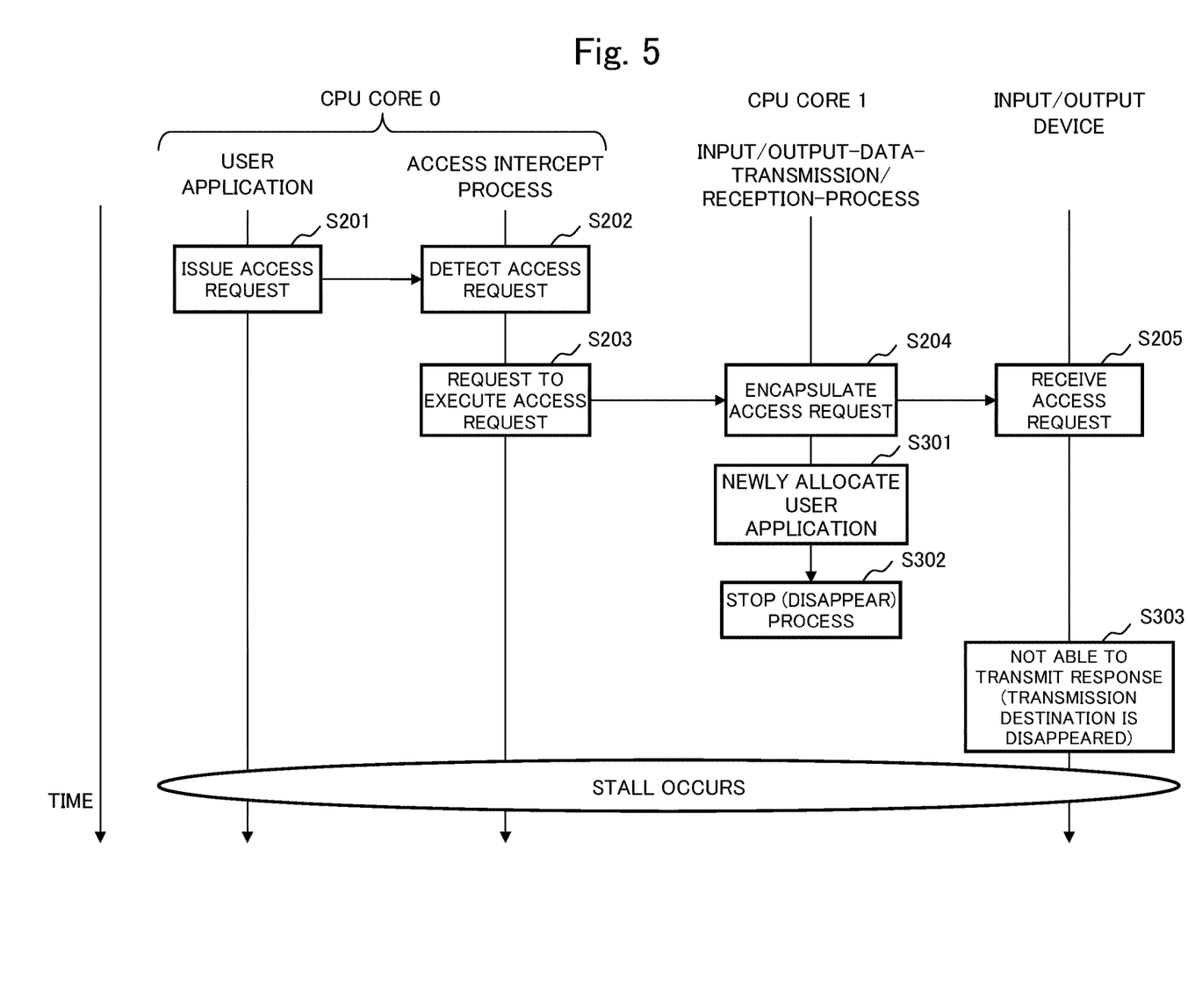
FIG. 5 is a sequence diagram in a case where a stall occurs in a process of processing the access request to the input/output device by the general system that achieves the ExpEther by the software.

FIG. 5 is a sequence diagram in a case where a stall occurs in a process of processing the access request to the input/output device by the general system that achieves the ExpEther by the software.

As in a case illustrated in FIG. 4, this system executes the processes in steps S201 to S205. Then, in a case illustrated in FIG. 5, a user application is newly allocated to the CPU core 1 (step S301), and thereby, the input/output-data-transmission/reception-process executed by the CPU core 1 is stopped (disappear) (step S302). The input/output-data-transmission/reception-process is stopped (disappear) because both of the user application and the input/output-data-transmission/reception-process are not allocated to the single CPU core as described above.

In this case, due to disappearance of a transmission destination of the response, it is not possible for the input/output device to transmit the response (step S303), and the process of the access request stalls. Therefore, a problem is to avoid occurrence of the stall as illustrated in FIG. 5 in the system implementing, for example, the ExpEther that achieves the communication control function by the hardware by the software. PTLs 1 and 2 do not mention this problem. A main object of the present invention is to provide an input/output process allocation control device and the like that solve this problem.

Solution to Problem

An input/output process allocation control device according to one aspect of the present invention includes allocation means for, in a case where a second information processing resource element different from a first information processing resource element executes an input/output-data-transmission/reception-process with an input/output device in response to an access request to the input/output device by the first information processing resource element among a plurality of information processing resource elements included in an information processing apparatus, allocating the input/output-data-transmission/reception-process to the second information processing resource element and excluding the second information processing resource element, of the plurality of information processing resource elements, from a new allocation destination of a process including the access request to the input/output device.

An input/output process allocation control method according to one aspect of the present invention, in another viewpoint to achieve the object, includes, in a case where a second information processing resource element different from a first information processing resource element executes an input/output-data-transmission/reception process with an input/output device in response to an access request to the input/output device by the first information processing resource element among a plurality of information processing resource elements included in a first information processing apparatus, by a second information processing apparatus, allocating the input/output-data-transmission/reception-process to the second information processing resource element and excluding the second information processing resource element, of the plurality of information processing resource elements, from a new allocation destination of a process including the access request to the input/output device.

Furthermore, in still another viewpoint to achieve the object, an input/output process allocation control program according to one aspect of the present invention is a program for causing a computer to achieve an allocation function to, in a case where a second information processing resource element different from a first information processing resource element executes an input/output-data-transmission/reception-process with an input/output device in response to an access request to the input/output device by the first information processing resource element among a plurality of information processing resource elements included in an information processing apparatus, allocate the input/output-data-transmission/reception-process to the second information processing resource element and exclude the second information processing resource element, of the plurality of information processing resource elements, from a new allocation destination of a process including the access request to the input/output device.

Moreover, the present invention can be achieved by a computer-readable nonvolatile recording medium that stores the input/output process allocation control program (computer program).

Advantageous Effects of Invention

The present invention can prevent data transmission and reception from being improperly stopped in a system in which an input/output-data-transmission/reception-process of transmitting/receiving data to/from an input/output device is allocated to any one of a plurality of information processing resource elements.

EXAMPLE EMBODIMENT

Hereinafter, example embodiments of the present invention will be described in detail with reference to the drawings.

First Example Embodiment

Figure 1:
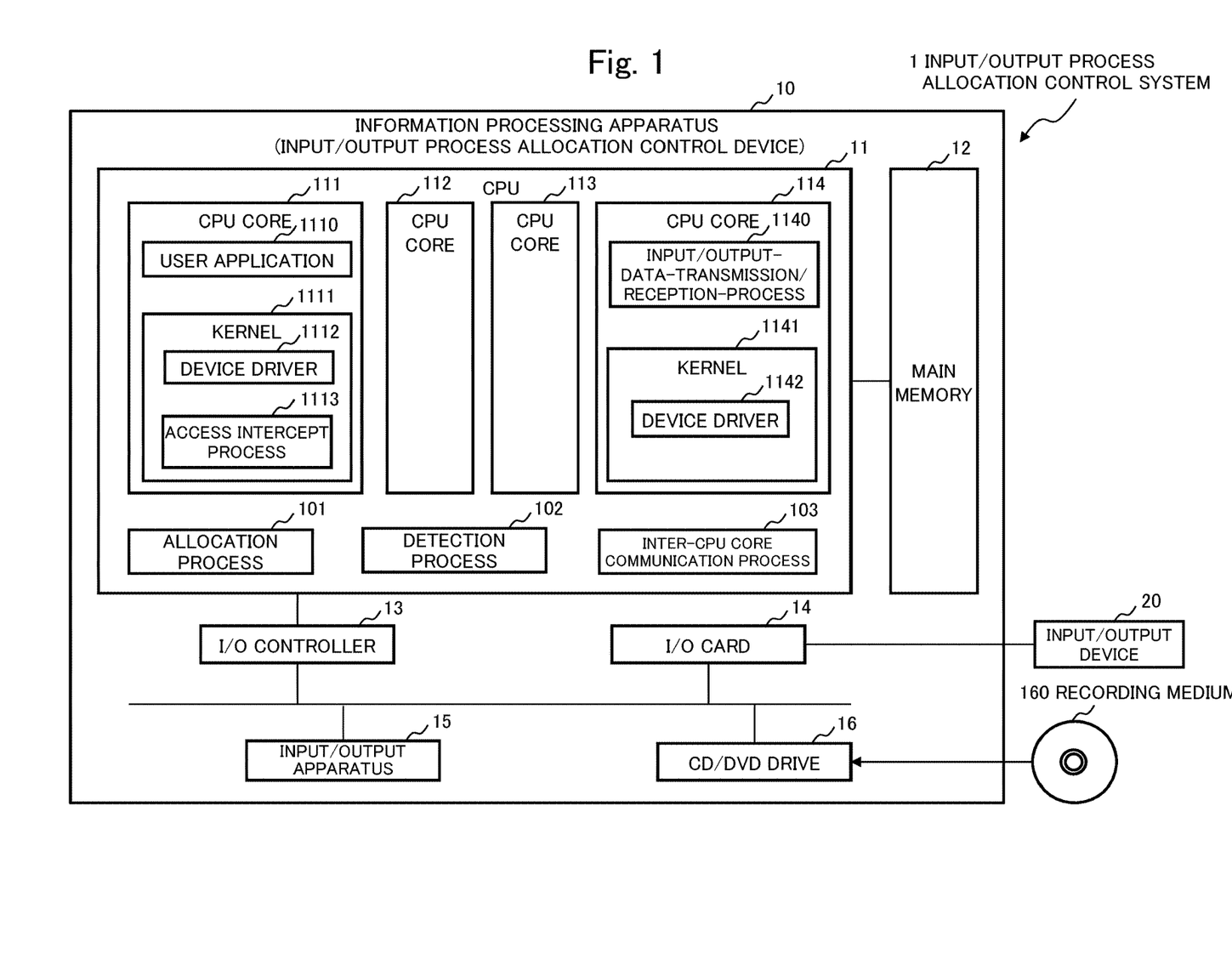
FIG. 1 is a block diagram illustrating a configuration of an input/output process allocation control system 1 according to a first example embodiment of the present invention.

FIG. 1 is a block diagram illustrating a configuration of an input/output process allocation control system 1 according to a first example embodiment of the present invention. The input/output process allocation control system 1 generally includes an information processing apparatus (input/output process allocation control device) 10 and an input/output device 20.

The information processing apparatus 10 is, for example, a server device that implements ExpEther by software and is communicably connected to the input/output device 20. The input/output device 20 is, for example, a storage device that has interface specifications conforming to the ExpEther.

The information processing apparatus 10 includes a CPU 11, a main memory 12, an I/O controller 13, an I/O card 14, an input/output apparatus 15, and a Compact Disc (CD)/Digital Versatile Disc (DVD) drive 16.

The CPU 11 inputs/outputs data (information) to/from the main memory 12 and the I/O controller 13. The CPU 11 can also input/output data to/from the I/O card 14, the input/output apparatus 15, and the CD/DVD drive 16 via the I/O controller 13.

The I/O card 14 is connected to the input/output device 20 by the ExpEther and controls input/output of data to/from the input/output device 20. The input/output apparatus 15 is an apparatus that has a user interface function, for example, a keyboard, a mouse, a display, or the like. The CD/DVD drive 16 is an example of a device that reads data from a recording medium 160 and writes data to the recording medium 160.

The information processing apparatus 10 has a function of allocating a user application 1110, an input/output data transmission/reception process 1140, or the like to four CPU cores 111 to 114 (information processing resource element) included in the CPU 11. However, as described later, the input/output-data-transmission/reception-process 1140 is a process necessary for executing the ExpEther regarding an access request to the input/output device 20 issued by the user application. The number of CPU cores included in the CPU 11 is not limited to four. Hereinafter, in the present application, details of a function as the input/output process allocation control device of the information processing apparatus 10 according to the present example embodiment will be described.

At least any one of the CPU cores 111 to 114 included in the CPU 11 executes an allocation process 101, a detection process 102, and an inter-CPU core communication process 103. However, it is assumed that programs used to execute the allocation process 101, the detection process 102, and the inter-CPU core communication process 103 be stored in a memory (for example, main memory 12 or the like) included in the information processing apparatus 10. Hereinafter, in the present application, there is a case where an operation performed by execution of the process such as the allocation process 101, the detection process 102, the inter-CPU core communication process 103, or the like by the information processing apparatus 10 is described as a subject that performs the operation such as the allocation process 101, the detection process 102, the inter-CPU core communication process 103, or the like.

The CPU core 111 (first information processing resource element) executes the user application 1110 allocated by the allocation process 101. However, the user application 1110 is an application that accesses data stored in the input/output device 20.

The CPU core 111 also executes a kernel 1111 of an OS. The kernel 1111 includes a device driver 1112 and an access intercept process 1113. The device driver 1112 controls an access by the ExpEther to the Input/output device 20 from the CPU core 111.

The access intercept process 1113 detects an access request to the input/output device 20 issued by the user application 1110. The access intercept process 1113 inputs the detected access request to the CPU core 114 via the inter-CPU core communication process 103. However, the inter-CPU core communication process 103 controls communication (data exchange or the like) performed between the CPU cores.

The CPU core 114 (second information processing resource element) executes the input/output-data-transmission/reception-process 1140 allocated by the allocation process 101. The CPU core 114 also executes a kernel 1141 of the OS. The kernel 1141 includes a device driver 1142. The device driver 1142 controls an access by the ExpEther by using the I/O card 14.

The input/output-data-transmission/reception-process 1140 includes a process of encapsulating packet data, transmitted from the information processing apparatus 10 to the input/output device 20, in accordance with the interface specification of the ExpEther. The input/output-data-transmission/reception-process 1140 also includes a process of decapsulating (cancel encapsulation) the packet data that has been encapsulated in accordance with the interface specification of the ExpEther and has been received by the information processing apparatus 10 from the input/output device 20.

The allocation process 101 according to the present example embodiment fixes an allocation destination of the input/output-data-transmission/reception-process 1140 to the CPU core 114. That is, the information processing apparatus 10 according to the present example embodiment uses the CPU core 114 as a CPU core dedicated to executing the ExpEther by software. Therefore, the allocation process 101 allocates a new user application that accesses data stored in the input/output device 20 to at least any one of the CPU cores 111 to 113 except for the CPU core 114.

That is, for example, in a case where the information processing apparatus 10 starts to execute the new user application that accesses the data stored in the input/output device 20 by an input operation to the input/output apparatus 15 by a user, the allocation process 101 excludes the CPU core 114 from the allocation destination of the new user application.

In a case where an access intercept process is not incorporated into a kernel executed by the CPU core to which the new user application has been allocated, the allocation process 101 also incorporates the access intercept process into the kernel.

The detection process 102 detects that the CPU core 111 has received a response from the input/output device 20 in response to the access request to the input/output device 20. The detection process 102 can detect that the response from the input/output device has been received, for example, according to that a time based on a data amount of access to the input/output device 20 has elapsed from the start of the access to the input/output device 20. Alternatively, the detection process 102 may detect that the response from the input/output device has been received by detecting information indicating final data in the response from the input/output device.

The allocation process 101 may release the allocation of the input/output-data-transmission/reception-process 1140 to the CPU core 114 after the detection process 102 detects that the response from the input/output device 20 has been received.

Figure 2:
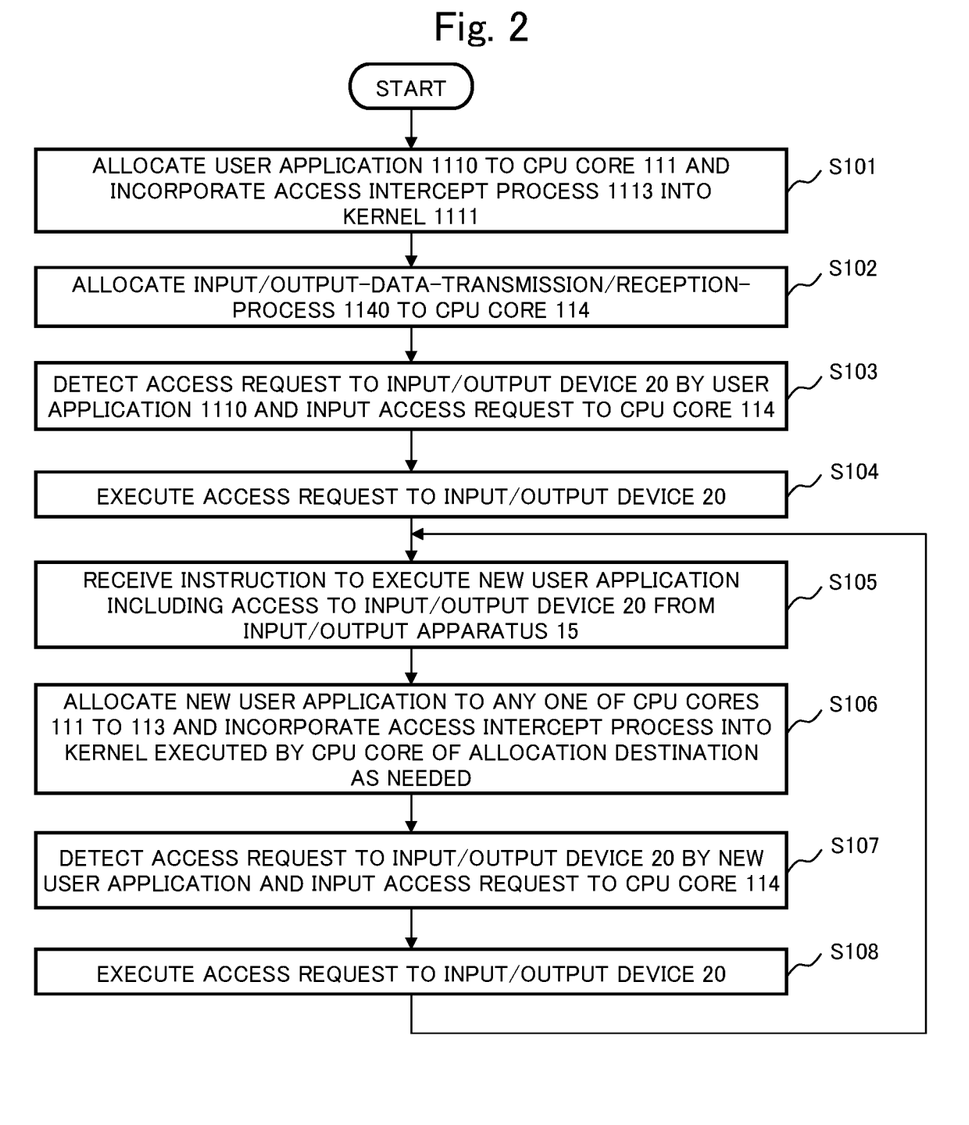
FIG. 2 is a flowchart illustrating an operation of an information processing apparatus 10 according to the first example embodiment of the present invention.

Next, an operation (process) of the information processing apparatus (input/output process allocation control device) 10 according to the present example embodiment will be described in detail with reference to the flowchart in FIG. 2.

The allocation process 101 allocates the user application 1110 to the CPU core 111 and incorporates the access intercept process 1113 into the kernel 1111 (step S101). The allocation process 101 allocates the input/output-data-transmission/reception-process 1140 to the CPU core 114 (step S102).

The access intercept process 1113 detects the access request to the input/output device 20 by the user application 1110 and inputs the access request to the CPU core 114 via the inter-CPU core communication process 103 (step S103).

The input/output-data-transmission/reception-process 1140 executes the access request to the input/output device 20 (step S104).

The CPU 11 receives, from the input/output apparatus 15, an instruction to execute a new user application including an access to the input/output device 20 (step S105). The allocation process 101 allocates the new user application to any one of the CPU cores 111 to 113 except for the CPU core 114 and incorporates the access intercept process into a kernel executed by the CPU core that is the allocation destination, as necessary (step S106).

The access intercept process executed by the CPU core that is the allocation destination detects an access request to the input/output device 20 by the new user application and inputs the access request to the CPU core 114 (step S107). The input/output-data-transmission/reception-process 1140 executes the access request to the input/output device 20 (step S108), and the process returns to step S105.

In a system in which the input/output-data-transmission/reception-process of transmitting/receiving data to/from the input/output device is allocated to any one of the plurality of information processing resource elements, the information processing apparatus (input/output process allocation control device) 10 according to the present example embodiment can prevent data transmission and reception from being improperly stopped. This is because the information processing apparatus 10 excludes the information processing resource element that executes the input/output-data-transmission/reception-process from the new allocation destination of the process including the access request to the input/output device.

Hereinafter, effects achieved by the information processing apparatus 10 according to the present example embodiment will be described in detail.

For example, in the system that achieves the ExpEther by the software, for avoidance of occurrence of deadlock or the like, the user application and the input/output-data-transmission/reception-process according to the access request to the input/output device issued by the user application are usually allocated to different information processing resource elements. In such a system, for example, as illustrated in FIG. 5, there is a problem in that, in a case where a user application is newly allocated to the information processing resource element that executes the input/output-data-transmission/reception-process, the process of the access request stalls by stopping (disappear) the input/output data transmission/reception process executed by the information processing resource element.

Against such a problem, the information processing apparatus (input/output process allocation control device) 10 according to the present example embodiment executes the allocation process 101 so to as operate as described above with reference to FIGS. 1 and 2, for example. That is, in the present example embodiment, in response to the access request to the input/output device 20 by the CPU core 111 (first information processing resource element) of the plurality of CPU cores 111 to 114 (information processing resource element) included in the information processing apparatus 10, the CPU core 114 (second information processing resource element) executes the input/output-data-transmission/reception-process 1140 with the input/output device 20. Then, the allocation process 101 allocates the input/output-data-transmission/reception process 1140 to the CPU core 114 and excludes the CPU core 114, of the CPU cores 111 to 114, from the new allocation destination of the process including the access request to the input/output device 20.

That is, because the information processing apparatus (input/output process allocation control device) 10 according to the present example embodiment does not newly allocate a user application to the CPU core 114 that executes the input/output-data-transmission/reception-process 1140, the problem such that the process of the access request to the input/output device 20 is stopped can be avoided by stopping (disappear) the input/output-data-transmission/reception-process.

The information processing apparatus 10 according to the present example embodiment fixes the CPU core that executes the input/output-data-transmission/reception-process to the CPU core 114. That is, because the information processing apparatus 10 secures the CPU core 114 as a CPU core dedicated to executing the input/output-data-transmission/reception-process, the problem such that the process of the access request to the input/output device 20 is stopped can be avoided by simple logic. It is not necessary for the information processing apparatus 10 to fix the CPU core that executes the input/output-data-transmission/reception-process to any one of the CPU cores, and the information processing apparatus 10 may allocate the input/output-data-transmission/reception-process to an appropriate CPU core according to an information processing status of each CPU core.

The information processing apparatus 10 according to the present example embodiment further executes the detection process 102 of detecting that the response to the access request to the input/output device 20 has been received from the input/output device 20. In this case, the allocation process 101 releases the allocation of the input/output-data-transmission/reception-process 1140 to the CPU core 114 once after the detection process 102 detects that the response from the input/output device 20 has been received.

For example, in a case where the CPU core 114 is set as the CPU core dedicated to executing the input/output-data-transmission/reception-process as described above, it is not possible to use the CPU core 114 as a CPU core that executes the user application. Therefore, a problem occurs in that an efficiency of using information processing resources is lowered. Against this problem, the information processing apparatus 10 according to the present example embodiment can release the allocation of the input/output-data-transmission/reception-process 1140 to the CPU core 114 once when there is no problem even if the input/output-data-transmission/reception-process 1140 is stopped by completing the reception of the response from the input/output device 20 as described above. Therefore, it is possible to avoid the problem such that the efficiency of using the information processing resources is lowered.

The information processing apparatus 10 may have a simple configuration that does not execute the detection process 102.

In the information processing apparatus 10 according to the present example embodiment, the CPU core is used as a unit (information processing resource element) of the allocations of the user application, the input/output-data-transmission/reception-process, or the like. However, the information processing resource element is not limited to the CPU core. The information processing resource element may be, for example, a CPU of an information processing apparatus including a plurality of CPUs or an allocation unit of a process in a virtual machine.

A communication control interface to be controlled by the information processing apparatus 10 is not limited to be the ExpEther in which PCI Express is virtualized on the Ethernet. The information processing apparatus 10 may control a communication control interface, other than the ExpEther, in which the second information processing resource element different from the first information processing resource element executes the input/output-data-transmission/reception-process with the input/output device in response to the access request to the input/output device by the first information processing resource element.

The functions achieved by the allocation process 101, the detection process 102, and the inter-CPU core communication process 103 according to the present example embodiment can be achieved by a configuration other than the configuration in which the CPU 11 executes programs regarding these processes. The information processing apparatus 10 may include, for example, an allocation unit, a detection unit, and an inter-CPU core communication unit that are hardware for achieving functions equivalent to the allocation process 101, the detection process 102, and the inter-CPU core communication process 103.

As a method of supplying a computer program that achieves the allocation process 101, the detection process 102, and the inter-CPU core communication process 103 according to the present example embodiment, a general procedure at present can be employed. The procedure includes, for example, a method of installing the computer program into the information processing apparatus via various recording media 160 such as a CD-ROM, a method of downloading the computer program from outside via a communication line such as the Internet, or the like. Then, in such a case, the present invention can be regarded to include codes included in the computer program or the recording medium 160 that stores the codes.

Second Example Embodiment

Figure 3:
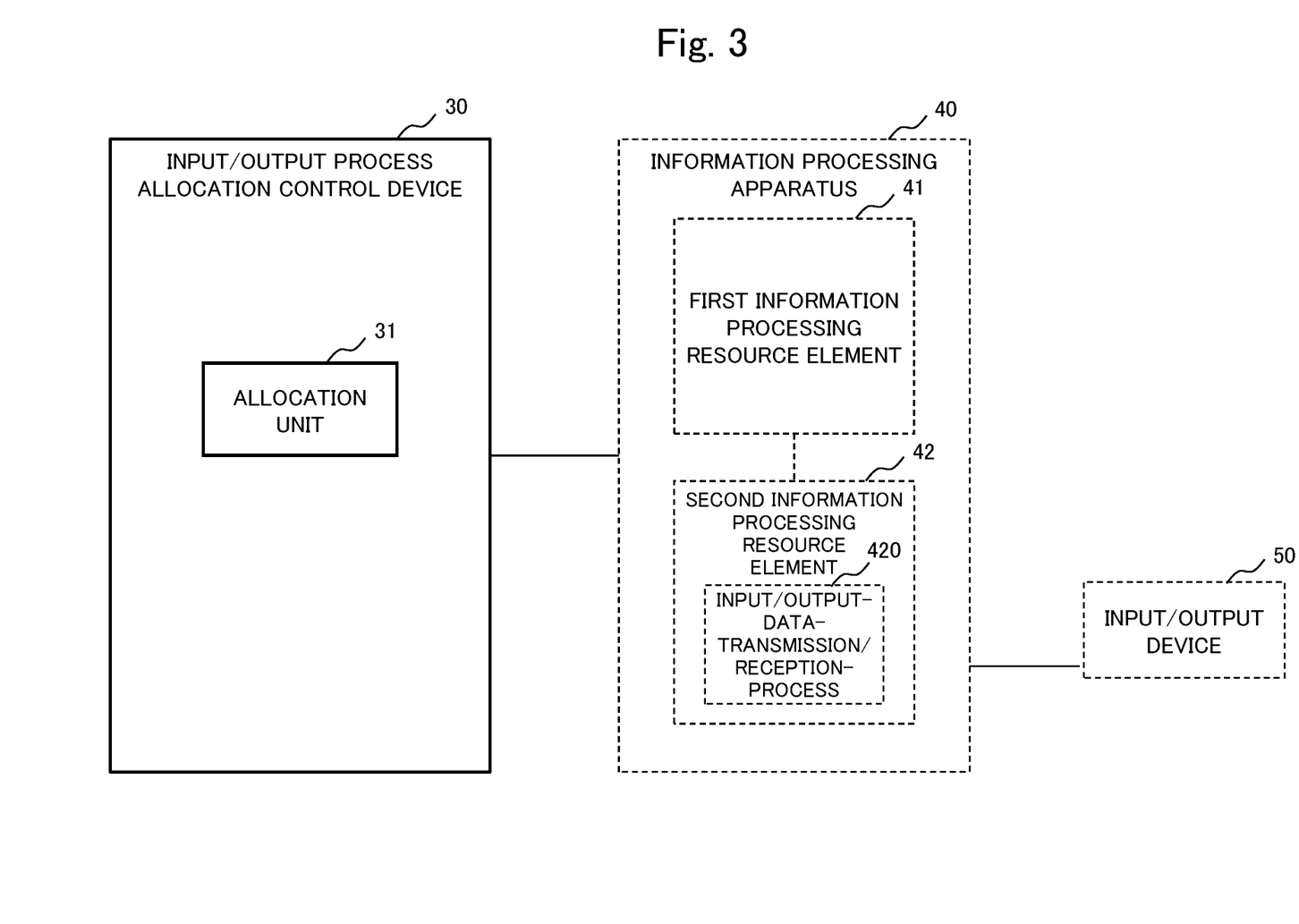
FIG. 3 is a block diagram illustrating a configuration of an input/output process allocation control device 30 according to a second example embodiment of the present invention.

FIG. 3 is a block diagram illustrating a configuration of an input/output process allocation control device 30 according to a second example embodiment of the present invention.

The input/output process allocation control device 30 according to the present example embodiment includes an allocation unit 31.

In the present example embodiment, in response to an access request to an input/output device 50 by a first information processing resource element 41 among a plurality of information processing resource elements included in an information processing apparatus 40, a second information processing resource element 42 different from the first information processing resource element 41 executes an input/output-data-transmission/reception-process 420 with the input/output device 50.

The allocation unit 31 allocates the input/output-data-transmission/reception-process 420 to the second information processing resource element 42 and excludes the second information processing resource element 42, of the plurality of information processing resource elements, from a new allocation destination of a process including the access request to the input/output device 50.

In a system in which the input/output-data-transmission/reception-process of transmitting/receiving data to/from the input/output device is allocated to any one of the plurality of information processing resource elements, the input/output process allocation control device 30 according to the present example embodiment can prevent data transmission and reception from being improperly stopped. This is because the input/output process allocation control device 30 excludes the information processing resource element that executes the input/output-data-transmission/reception-pro-cess from a new allocation destination of the process including the access request to the input/output device.

While the invention has been particularly shown and described with reference to exemplary embodiments thereof, the invention is not limited to these embodiments. That is, it will be understood by those of ordinary skill in the art that various modes may be applied therein without departing from the spirit and scope of the present invention as defined by the claims.

This application is based upon and claims the benefit of priority from Japanese patent application No. 2018-095886, filed on May 18, 2018, the disclosure of which is incorporated herein in its entirety by reference.

REFERENCE SIGNS LIST 1 input/output process allocation control system
10 information processing apparatus
101 allocation process
102 detection process
103 inter-CPU core communication process
11 CPU
111 to 114 CPU core
1110 user application
1111 kernel
1112 device driver
1113 access intercept process
1140 input/output-data-transmission/reception-process
1141 kernel
1142 device driver
12 main memory
13 I/O controller
14 I/O card
15 input/output apparatus
16 CD/DVD drive
160 recording medium
20 input/output device
30 input/output process allocation control device
31 allocation unit
40 information processing apparatus
41 first information processing resource element
42 second information processing resource element
420 input/output-data-transmission/reception-process
50 input/output device

What is claimed is:

1. An input/output process allocation control device comprising:
at least one memory storing a computer program; and
at least one processor configured to execute the computer program to
in a case where a second information processing resource element different from a first information processing resource element execute an input/output-data-transmission/reception-process with an input/output device in response to an access request to the input/output device by the first information processing resource element, the first and second information processing resource elements being among a plurality of information processing resource elements included in an information processing apparatus,
allocate the input/output-data-transmission/reception-process to the second information processing resource element and excluding the second information processing resource element, of the plurality of information processing resource elements, from a new allocation destination of a process including an access request to the input/output device.

2. The input/output process allocation control device according to claim 1, wherein the processor is configured to execute the computer program to fix the second information processing resource element to a specific information processing resource element among the plurality of information processing resource elements.

3. The input/output process allocation control device according to claim 1, wherein the processor is configured to execute the computer program to detect that a response from the input/output device with respect to the access request to the input/output device has been received by the first information processing resource element, wherein after having detected that the response from the input/output device has been received, release the allocation of the input/output-data-transmission/reception-process to the second information processing resource element.

4. The input/output process allocation control device according to claim 3, wherein the processor is configured to execute the computer program to detect that the response from the input/output device has been received according to that a time based on a data amount of access to the input/output device has elapsed from start of the access to the input/output device.

5. The input/output process allocation control device according to claim 1, wherein the plurality of information processing resource elements are cores included in a Central Processing Unit (CPU), CPUs, or allocation units of processes in a virtual machine.

6. The input/output process allocation control device according to claim 1, wherein the input/output device uses Peripheral Component Interconnect (PCI) express and Ethernet as interface specifications.

7. An input/output process allocation control method comprising:

in a case where a second information processing resource element different from a first information processing resource element executing an input/output-data-transmission/reception-process with an input/output device in response to an access request to the input/output device by the first information processing resource element, the first and second information processing resource elements being among a plurality of information processing resource elements included in a first information processing apparatus, by a second information processing apparatus, allocating the input/output-data-transmission/reception-process to the second information processing resource element and excluding the second information processing resource element, of the plurality of information processing resource elements, from a new allocation destination of a process including an access request to the input/output device.

8. A non-transitory computer-readable recording medium storing an input/output process allocation control program for causing a computer to achieve:

an allocation function, in a case where a second information processing resource element different from a first information processing resource element executes an input/output-data-transmission/reception-process with an input/output device in response to an access request to the input/output device by the first information processing resource element, the first and second information processing resource elements being among a plurality of information processing resource elements included in an information processing apparatus, to allocate the input/output-data-transmission/reception-process to the second information processing resource element and exclude the second information processing resource element, of the plurality of information processing resource elements, from a new allocation destination of a process including an access request to the input/output device.

* * * * *